United States Patent
Fries et al.

(10) Patent No.: US 10,068,309 B2
(45) Date of Patent: Sep. 4, 2018

(54) INTERFACE APPARATUS AND METHOD OF OPERATING AN INTERFACE APPARATUS

(71) Applicant: ARM LIMITED, Cambridge (GB)

(72) Inventors: Jakob Axel Fries, Malmö (SE); Henrik Nils-Sture Olsson, Malmö (SE); Oskar Flordal, Uppsala (SE); Sharjeel Saeed, Cambridge (GB)

(73) Assignee: ARM Limited, Cambridge (GB)

( * ) Notice: Subject to any disclaimer, the term of this patent is extended or adjusted under 35 U.S.C. 154(b) by 64 days.

(21) Appl. No.: 15/254,079

(22) Filed: Sep. 1, 2016

(65) Prior Publication Data
US 2017/0076419 A1    Mar. 16, 2017

(30) Foreign Application Priority Data
Sep. 10, 2015    (GB) .................................. 1516043.5

(51) Int. Cl.
  *G06T 1/20*    (2006.01)
  *G06T 1/60*    (2006.01)
  *H04N 19/426*    (2014.01)
  *H04N 19/436*    (2014.01)

(52) U.S. Cl.
  CPC .................. *G06T 1/20* (2013.01); *G06T 1/60* (2013.01); *H04N 19/426* (2014.11); *H04N 19/436* (2014.11)

(58) Field of Classification Search
  None
  See application file for complete search history.

(56) References Cited

U.S. PATENT DOCUMENTS

| | | | |
|---|---|---|---|
| 6,141,055 A * | 10/2000 | Li | H04N 7/0105 348/446 |
| 2003/0231121 A1 | 12/2003 | Sakaguchi | |
| 2009/0244074 A1 * | 10/2009 | Montrym | G06T 1/60 345/522 |
| 2013/0328889 A1 * | 12/2013 | Chen | G06T 1/60 345/501 |

OTHER PUBLICATIONS

Combined Search and Examination Report for GB1516043.5 dated Mar. 10, 2016, 5 pages.

* cited by examiner

*Primary Examiner* — James A Thompson
(74) *Attorney, Agent, or Firm* — Nixon & Vanderhye P.C.

(57) ABSTRACT

An interface apparatus and method of operating the same are provided. The interface apparatus receives an uncompressed image data read request using a first addressing scheme at a first bus interface and transmits a compressed image data read request using a second addressing scheme from a second bus interface. Address translation circuitry translates between the first addressing scheme and the second addressing scheme. Decoding circuitry decodes a set of compressed image data received via the second bus interface to generate the set of uncompressed image data which is then transmitted via the first bus interface. The use of a second addressing scheme and image data compression is thus transparent to the source of the uncompressed image data read request, and the interface apparatus can therefore be used to connect devices which use different addressing schemes and image data formats, without either needing to be modified.

16 Claims, 13 Drawing Sheets

| 0T | 0T | 1T | 1T | 2T | 2T | 3T | 3T |
|----|----|----|----|----|----|----|----|
| 0B | 0B | 1B | 1B | 2B | 2B | 3B | 3B |
FIG. 4A
| 8T | 8T | 4B | 4B | 8B | 8B | 5B | 5B |
|----|----|----|----|----|----|----|----|
| 9T | 9T | 6B | 6B | 9B | 9B | 7B | 7B |
FIG. 4E
| -  | -  | -  | -  | 2T | 2T | 3T | 3T |
|----|----|----|----|----|----|----|----|
| 0B | 0B | 1B | 1B | 2B | 2B | 3B | 3B |
FIG. 4B
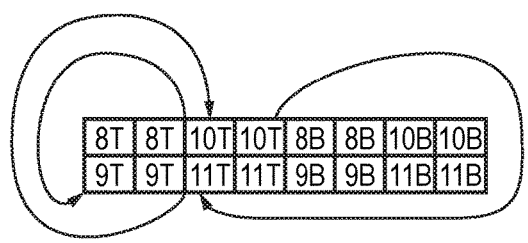
FIG. 4F
| 4T | 4T | 4B | 4B | 2T | 2T | 3T | 3T |
|----|----|----|----|----|----|----|----|
| 0B | 0B | 1B | 1B | 2B | 2B | 3B | 3B |
FIG. 4C
| 12T | 12T | 13T | 13T | 8B | 8B | 10B | 10B |
|-----|-----|-----|-----|----|----|-----|-----|
| 12B | 12B | 13B | 13B | 9B | 9B | 11B | 11B |
FIG. 4G
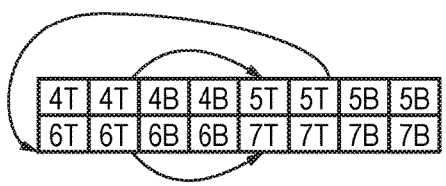
FIG. 4D
| 12T | 12T | 13T | 13T | 14T | 14T | 15T | 15T |
|-----|-----|-----|-----|-----|-----|-----|-----|
| 12B | 12B | 13B | 13B | 14B | 14B | 15B | 15B |
FIG. 4H
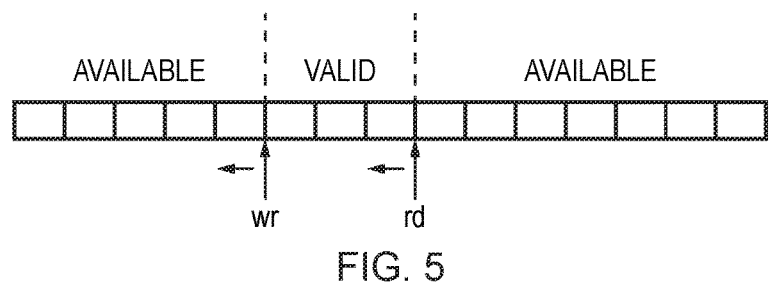
FIG. 5

|  | 1st BLOCK ↓ | 2nd BLOCK ↓ | 3rd BLOCK ↓ |  | 30th BLOCK ↓ |
|---|---|---|---|---|---|
| BLOCK ROW 1 | 0 | 8 | 16 | 24 | ⋯ | 232 |
|  | 1 | 9 |  |  |  |
|  | 2 | ⋮ | ⋮ |  |  |
|  | 3 |  |  |  |  |
|  | 4 |  |  |  |  |
|  | 5 |  |  |  |  |
|  | 6 | 14 |  |  |  |
|  | 7 | 15 | 23 | 31 | ⋯ | 239 |

| BLOCK ROW 2 | 0 | 64 | 128 |
|---|---|---|---|
|  | 8 | 72 |  |
|  | 16 |  |  |
|  | 24 | ⋮ | ⋮ |
|  | 32 |  |  |
|  | 40 |  |  |
|  | 48 | 112 |  |
|  | 56 | 120 | 191 |

| BLOCK ROW 3 | 0 | 33 |
|---|---|---|
|  | 64 | 97 |
|  | 128 |  |
|  | 192 |  |
|  | 17 | ⋮ |
|  | 81 |  |
|  | 145 |  |
|  | 209 |  |

FIG. 6

```
class SeqT:
    def __init__(self, h, n):
        self.h = h
        self.n = n
        self.skip = 1              # initialize skip length to 1 def gen_seq(self):
        l = []
        x = 0                      # set state to 0; always start at address 0
        for i in range(self.n):
            l.append(x)            # make a record of the current state
            x += self.skip         # add skip length
            while x >= self.n:     # if the address is beyond the valid range of memory,
                                   # then for each "wrap":
                x -= self.n        # wrap around to start from beginning again
                x += 1             # skew writes by 1
        return l def evolve(self):
        self.skip *= self.h        # when processing the next pass, multiply skip length by
                                   # line count
```

FIG. 9

INTERFACE APPARATUS AND METHOD OF OPERATING AN INTERFACE APPARATUS

This application claims priority to GB Patent Application No. 1516043.5 filed 10 Sep. 2015, the entire content of which is hereby incorporated by reference.

TECHNICAL FIELD

The present disclosure relates to the field of data processing. More particularly it relates to the encoding and decoding of image data.

BACKGROUND

In a data processing device which handles image data, in order to reduce bandwidth and power consumption associated with the transfer of large frames of image data in the system, the image data may be compressed. Transferring frames of image data (or portions thereof) in this compressed format thus reduces the overall system bandwidth consumption and power usage, and furthermore reduces the storage space required for such image data to be held in the system, for example when stored in memory. Whilst frames of image data are typically referenced according to a spatial coordinate system, this may not be the most efficient reference system for compressed data, which may for example be compressed in a block-wise manner, and accordingly in this situation there are then at least two addressing schemes used within the system, namely a spatial coordinate scheme and a block-based coordinate scheme. Where the compressed data is stored using a compression which applies the block-based addressing scheme, access to that compressed data must then be made in terms of the required blocks, rather than the spatial coordinates of the uncompressed image data to which it corresponds.

SUMMARY

In at least some embodiments the present techniques provide an interface apparatus comprising: a first bus interface to receive an image data read request, wherein the image data read request specifies a set of uncompressed image data using a first addressing scheme; a second bus interface to transmit a compressed image data read request using a second addressing scheme; address translation circuitry to translate the first addressing scheme of the image data read request into the second addressing scheme of the compressed image data read request, wherein the compressed image data read request specifies a set of compressed image data corresponding to the set of uncompressed image data; and decoding circuitry to decode the set of compressed image data received via the second bus interface to generate the set of uncompressed image data, wherein the apparatus is responsive to generation of the set of uncompressed image data to transmit the set of uncompressed image data via the first bus interface.

In at least some embodiments the present techniques provide a method of operating an interface apparatus comprising: receiving an image data read request at a first bus interface, wherein the image data read request specifies a set of uncompressed image data using a first addressing scheme; translating the first addressing scheme of the image data read request into a second addressing scheme of a compressed image data read request, wherein the compressed image data read request specifies a set of compressed image data corresponding to the set of uncompressed image data; transmitting a compressed image data read request using a second addressing scheme from a second bus interface; decoding the set of compressed image data received via the second bus interface to generate the set of uncompressed image data; and in response to generation of the set of uncompressed image data, transmitting the set of uncompressed image data via the first bus interface.

In at least some embodiments the present techniques provide an interface apparatus comprising: means for receiving an image data read request at a first bus interface, wherein the image data read request specifies a set of uncompressed image data using a first addressing scheme; means for translating the first addressing scheme of the image data read request into a second addressing scheme of a compressed image data read request, wherein the compressed image data read request specifies a set of compressed image data corresponding to the set of uncompressed image data; means for transmitting a compressed image data read request using a second addressing scheme from a second bus interface; means for decoding the set of compressed image data received via the second bus interface to generate the set of uncompressed image data; and means for transmitting the set of uncompressed image data via the first bus interface in response to generation of the set of uncompressed image data.

In at least some embodiments the present techniques provide an interface apparatus comprising: a first bus interface to receive a set of uncompressed image data having a first addressing scheme; a second bus interface to transmit a set of compressed image data having a second addressing scheme; address translation circuitry to translate the first addressing scheme of the uncompressed image data into the second addressing scheme of the compressed image data; and encoding circuitry to encode the set of uncompressed image data received via the first bus interface to generate the set of compressed image data, wherein the apparatus is responsive to generation of the set of compressed image data to transmit the set of compressed image data via the second bus interface.

In at least some embodiments the present techniques provide a method of operating an interface apparatus comprising: receiving a set of uncompressed image data at a first bus interface, the set of uncompressed image data having a first addressing scheme; translating the first addressing scheme of the uncompressed image data into a second addressing scheme of a set of compressed image data; encoding the set of uncompressed image data received via the first bus interface to generate the set of compressed image data; and in response to generation of the set of compressed image data, transmitting the set of compressed image data via the second bus interface.

In at least some embodiments the present techniques provide an interface apparatus comprising: means for receiving a set of uncompressed image data at a first bus interface, the set of uncompressed image data having a first addressing scheme; means for translating the first addressing scheme of the uncompressed image data into a second addressing scheme of a set of compressed image data; means for encoding the set of uncompressed image data received via the first bus interface to generate the set of compressed image data; and means for transmitting the set of compressed image data via the second bus interface in response to generation of the set of compressed image data.

BRIEF DESCRIPTION OF THE DRAWINGS

The present techniques will be described further, by way of example only, with reference to embodiments thereof as illustrated in the accompanying drawings, in which:

FIGS. 4A-H show an example of de-tiling buffer content being written on a block-basis and read on a line-basis in one embodiment;

FIG. 5 shows the maintenance of a read pointer and a write pointer to track valid de-tiling buffer content in one embodiment;

FIG. 6 shows rows of blocks of an image frame and where the data words of blocks of each row are written to in terms of de-tiling buffer addresses in one embodiment;

FIG. 9 shows example program code defining one form of the address calculation carried out by control circuitry within the de-tiling control circuitry of FIG. 8 in one embodiment;

DESCRIPTION OF EMBODIMENTS

Figure 1:
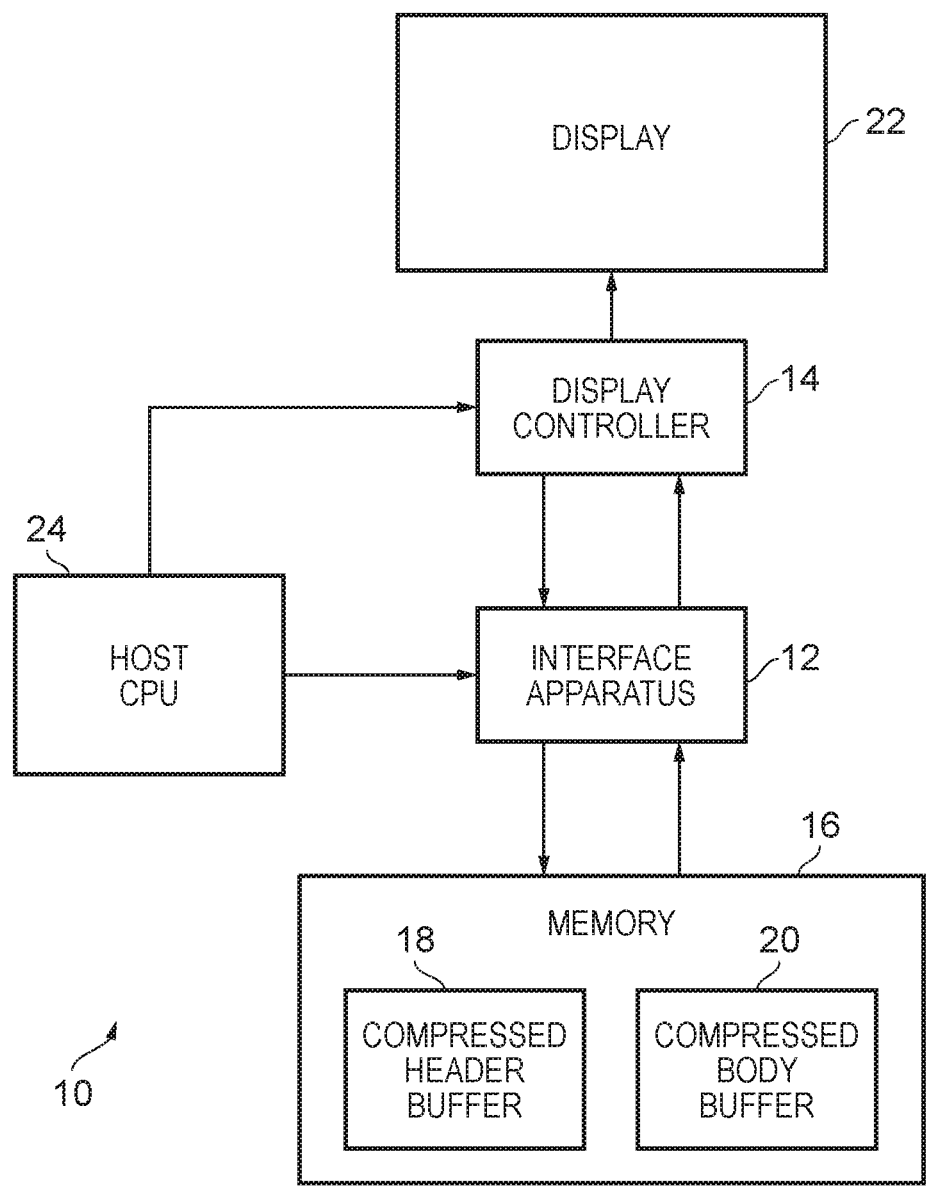
FIG. 1 schematically illustrates an image processing system having an interface apparatus of one embodiment.

At least some embodiments provides an interface apparatus comprising: a first bus interface to receive an image data read request, wherein the image data read request specifies a set of uncompressed image data using a first addressing scheme; a second bus interface to transmit a compressed image data read request using a second addressing scheme; address translation circuitry to translate the first addressing scheme of the image data read request into the second addressing scheme of the compressed image data read request, wherein the compressed image data read request specifies a set of compressed image data corresponding to the set of uncompressed image data; and decoding circuitry to decode the set of compressed image data received via the second bus interface to generate the set of uncompressed image data, wherein the apparatus is responsive to generation of the set of uncompressed image data to transmit the set of uncompressed image data via the first bus interface.

The interface handles both compressed and uncompressed image data and uses a different addressing scheme for each. Moreover, the interface apparatus is provided with address translation circuitry giving it the capability to translate between the two addressing schemes. The interface apparatus is provided with a first bus interface at which it can receive an image data read request specifying a set of uncompressed image data. Further, the interface apparatus is provided with a second bus interface via which it is able to transmit a compressed image data read request. The image data read request which the interface apparatus receives at the first bus interface uses the first addressing scheme, whilst the interface apparatus makes use of its address translation circuitry to translate between the first addressing scheme used for the received image data read request (received at the first bus interface) and the second addressing scheme used for the compressed image data read request for the compressed image data read request (which it will then transmit from its second bus interface). Accordingly, the interface apparatus is able to be positioned between a first device which issues image data read requests for uncompressed image data using a first addressing scheme and a second device which handles corresponding compressed image data using a second addressing scheme. In effect, the interface apparatus thus enables the first device which issues the image data read requests for the uncompressed image data to access the other device which handles the image data in its compressed format using the second addressing scheme, without the first device requiring any knowledge of the second addressing scheme or indeed even that the image data which it requests is in fact handled by a second device in a compressed format. Indeed, from the perspective of the first device, the first bus interface of the interface appears identical to a direct interface into a device holding the requested image data in uncompressed form.

The interface apparatus is further provided with decoding circuitry which decodes compressed image data which it receives via its second bus interface in order to generate uncompressed image data and this uncompressed image data is then transmitted from the first bus interface in order to service the image data read request which was also received via the first bus interface. As mentioned above, the provision of this interface apparatus thus means that the first device which requests the set of uncompressed image data need have no knowledge of the fact that it is in fact a second device which ultimately services the image data read request. Conversely, the second device which receives the compressed image data read request using the second addressing scheme need have no knowledge of the existence or particular configuration of the first device which is the source of the request for that image data. This means that the first device can be arranged to use a first addressing scheme which is more appropriate to the uncompressed image data which it handles, whilst the second device can be configured to use a second addressing scheme which is more appropriate to the compressed image data which it handles. Accordingly, each of these devices which the interface apparatus can connect together can then be more simply and efficiently configured and in particular will not require any adaptation in order to be connected to one another, when the interface apparatus of the present techniques is used to provide that connection. Such an interface apparatus may find a variety of usages, but one example is where the interface apparatus receives image data read requests at its first bus interface from a display controller which is providing pixel data line-by-line to a display and where the second device is a memory in which compressed image data is stored in a block-based manner, which is advantageous in terms of the compression opportunities which that provides, but also requires a corresponding addressing scheme suitable for use with such compressed blocks of image data.

In some embodiments the interface apparatus comprises a third bus interface to receive configuration data to configure operation of at least one of the address translation circuitry and the decoding circuitry. This third bus interface may for example allow a host CPU to set up a surface configuration for the interface apparatus, comprising details about pointer configuration, pixel format, compression and decompression configuration parameters and so on. Accordingly, various aspects of the operation of the interface apparatus may be managed in this way, providing a more flexible and adaptable interface.

The first and second addressing schemes may take a variety of forms, but in some embodiments the first addressing scheme is a spatial coordinate-based addressing scheme and the second addressing scheme is a compression block-based addressing scheme.

It is advantageous when decoding compressed image data that the same data does not need to be decompressed multiple times, and accordingly in embodiments where the compression is block-based but the first addressing scheme is a spatial coordinate based addressing scheme, some buffering capability within the interface apparatus enables decompressed block-based image data to be held until it is required. For example when blocks of compressed image data are subjected to the decompression, but the requests for image data are in terms of pixel lines, a number of blocks of decompressed image data can be held such that as the line-by-line requests for image data progress the blocks of decompressed image data (covering several lines) can be made use of. Accordingly, in some embodiments the interface apparatus comprises a de-tiling buffer to store the set of uncompressed image data decoded by the decoding circuitry before transmission via the first bus interface; and de-tiling control circuitry to control access to the de-tiling buffer such that the set of uncompressed image data is written to the de-tiling buffer in compression block units and is read from the de-tiling buffer in pixel row units. This reading could be of an entire frame-width pixel row, or just a portion thereof.

Nevertheless, an issue with the provision of such a de-tiling buffer is the management of writing to and reading from such a buffer in an efficient manner. One simple way of administering this storage capacity is to provide two buffers, where one is written to whilst the other is read from, and vice versa. For example, blocks of uncompressed image data may be written to one buffer until a full frame width has thus been stored, after which this buffer may be read from in a line-by-line manner, whilst the block based writing begins in the second buffer. However, the present techniques recognise that a more efficient storage solution for providing the de-tiling buffer may be achieved with a particular approach to the reading and writing procedure and accordingly, in some embodiments the de-tiling control circuitry is arranged to administer an access procedure with respect to the de-tiling buffer, the access procedure comprising: a) writing image data words for a first row of blocks of uncompressed image data to the de-tiling buffer at sequential buffer addresses, wherein each block is represented by N image data words; b) reading image data words for a pixel row from the de-tiling buffer from a read sequence of buffer addresses which comprises skip steps of $B \cdot (N/B)^R - (B-1)$ buffer addresses, where R is a block row number and B is the number of image data words in each pixel line of a block, and the buffer addresses are subject to modulo M, where M is the number of image data words in each frame-width block row; c) when N image data words have been read from the de-tiling buffer, writing image data words to the de-tiling buffer at the read sequence of buffer addresses; iteratively repeating steps b) and c).

According to this access procedure when lines of image data words are read from the de-tiling buffer the next arriving blocks of uncompressed image data are able to be written into the de-tiling buffer by immediately taking advantage of sufficient space having been freed by the reading. Specifically, as soon as a number of image data words corresponding to a block of uncompressed image data has been read from the de-tiling buffer (despite the fact that the reading is not itself performed in terms of blocks, but rather in terms of pixel rows), the next arriving just-uncompressed block of image data can be directly written to the space which has just been released by the reading procedure. Overall, this has the advantage that a notably smaller de-tiling buffer can be provided, indeed may be only half the size of a traditional de-tiling buffer arrangement having two buffers, each sized to hold a full frame width of blocks of uncompressed image data, where one buffer is read from whilst the other is written to. The access procedure of the present techniques enables only a single buffer of this type to be required, i.e. sized to hold a full frame width of uncompressed image blocks, because of the manner in which the buffer addresses are used. In particular, the present techniques recognise that this can be achieved, if when reading out a frame width pixel row a sequence of read buffer addresses which comprises "jumps" or "skip steps" which account for the fact that the buffer addresses are written to in blocks, but read from in lines. Moreover, the present techniques recognise that size of these skip steps must be commensurately increased for each block row of image which is passed through the de-tiling buffer, but nevertheless that eventually the increase in size of these skip steps will "wrap around" and the pattern of reads and writes repeats.

The number of image data words in each pixel line of a block may vary depending on the particular system and encoding protocol under consideration, but in some embodiments B, the number of image data words in each pixel line of a block, is at least two. This means that when reading image data words for a pixel row from the de-tiling buffer, sequential buffer addresses corresponding to the number of image data words in each pixel line of a block are read, interspersed by the above mentioned skip steps which increase in size until they wrap around i.e. the skip step returns to zero.

There are a number of different ways in which the read sequence of buffer addresses may be generated, but in some embodiments the interface apparatus comprises address manipulation circuitry to generate the read sequence of buffer addresses from a sequential set of buffer addresses by applying a bit rotation operation to the sequential set of buffer addresses. Thus, by performing this bit rotation operation a "bit swizzling" is effected which can provide the required skip steps.

The bit rotation operation may be applied to the full width of a buffer address, but in some embodiments the sequential set of buffer addresses comprise a static portion which is not subject to the bit rotation operation. Accordingly, this static portion will increment in the usual manner, without skips, and may for example enable the above mentioned feature of B, the number of image data words in each pixel line of a block, to be correctly accounted for in the read sequence of buffer addresses, in that the sequential buffer addresses required to read across a pixel line of a block are provided by the static portion, whilst the remainder (the dynamic portion) of the buffer address is subject to the bit rotation operation and the skip steps between those sequential buffer addresses are thus provided.

The administration of the de-tiling buffer may be handled in a variety of ways, for example in terms of the administration of the validity of the data words stored in the de-tiling buffer, but in some embodiments the interface apparatus comprises image data validity circuitry to maintain a read pointer and a write pointer with respect to buffer addresses in the de-tiling buffer, wherein buffer addresses between the read pointer and the write pointer hold valid image data.

In some embodiments the interface apparatus comprises prefetching circuitry to monitor occupancy of the de-tiling buffer and, when the de-tiling buffer has capacity to store a block of image data, to instruct the decoding circuitry to decode compressed image data corresponding to a next block of image data for which a subsequent image data read request is expected. In the context of an interface apparatus such as that provided by the present techniques, which receives image data requests for uncompressed image data, and services these image data requests by retrieving compressed image data via its second bus interface, the provision of such prefetching circuitry can be useful, since the involvement of the address translation circuitry, the decoding circuitry and the particular manner in which the image data is compressed, may lead to an access latency which a device accessing the interface apparatus via its first bus interface does not expect. Thus in order to further support the transparency of the interface apparatus of the present techniques the ability to prefetch compressed image data can mitigate against such access latency. For example, in terms of the compression algorithm used, it may be the case that the compressed image data is subdivided into compressed blocks of header data and compressed blocks of body data, wherein access to the header data is first required in order to then access the body data. This two stage process could lead to the above mentioned access latency and the prefetching capability of such embodiments addresses this.

The particular manner in which the set of compressed image data received by the second bus interface is handled may take a variety of forms, but in some embodiments the interface apparatus further comprises a compressed image data cache storage and a compressed image data buffer to store the set of compressed image data received via the second bus interface for access by the decoding circuitry; and control circuitry responsive to the compressed image data read request to perform a lookup in the compressed image data cache storage for a first word and a last word specified in the compressed image data read request, wherein the control circuitry is responsive to at least one of the first word and the last word hitting in the compressed image data cache storage to modify the compressed image data read request to omit at least one cache line request corresponding to the at least one of the first word and the last word which hit.

The present techniques recognise that the tight packing of compressed image data in memory may mean that the end of one set of compressed image data (e.g. a "superblock") and the start of the next set of compressed image data (e.g. a second superblock) may well fall in a position in memory such that these are retrieved together, e.g. on the same cache line. To give just one example, where cache lines of 64 bytes are used, whilst the size of the payload data (the majority part of) a superblock is of the order of hundreds of bytes, yet the size of each packed superblock is at byte granularity, it becomes very likely that the end of one block and the start of the next block are on the same cache line. Nevertheless, the present techniques further recognise that providing full cache storage capability for all the compressed image data retrieved via the second bus interface is not in fact necessary, and it is only the shared portions (e.g. cache lines) of the sets of compressed image data received (e.g. payload superblocks) for which this cache functionality is particularly beneficial. Accordingly, the present techniques provide an interface apparatus in which the storage capacity for this compressed image data is more simply provided by only providing a part of it with cache storage capability and by providing the remainder in a simple buffer storage form. Hence, when a new set of compressed image data is to be retrieved via the second bus interface a cache lookup is then performed for the beginning and end of that set of compressed image data (i.e. the first word and the last word specified in the compressed image data read request) and cache line requests corresponding to at least one of the first word and the last word can then be omitted if a corresponding cache line is already present in the cache storage. Only the "middle portion" of the compressed image data read request need certainly be transmitted via the second bus interface, and at least one of the "ends" may be omittable. The resulting compressed image data received via the second bus interface can be stored in the compressed image data buffer, and the original full compressed image data read request can then be serviced with a portion coming from the cache storage and the majority coming from the data buffer. To give just one configuration example, in order to be able store the data for four superblocks of compressed image data eight 64 byte lines in a cache and sixty four 64 byte lines in a "one time" storage buffer may be provided. Importantly, the logic to handle this is then smaller than it would be if all seventy two 64 byte lines were cache lines with the associated logic to service them in a cache-like manner. A more compact interface apparatus is thus provided.

In some embodiments the control circuitry comprises a reference counter for each cache line in the compressed image data cache storage, the control circuitry is responsive to reception of the compressed image data read request to increment reference counters of cache lines corresponding to the compressed image data read request, the control circuitry is responsive to both the first word and the last word hitting in the compressed image data cache storage and content of the compressed image data buffer for the compressed image data read request having been read to decrement the reference counters of the cache lines corresponding to the compressed image data read request, and the control circuitry is responsive to a reference counter of a cache line being decremented to a predetermined value to mark the cache line as unused. Accordingly, reference counters associated with the cache lines in the compressed image data cache can therefore be used to keep track of multiple compressed image data read requests which may make use of the content of a particular cache line and this mechanism provides that the content of that cache line will be maintained until all pending compressed image data read requests which require access to it have been serviced.

At least some embodiments provide an interface apparatus comprising: a first bus interface to receive a set of uncompressed image data having a first addressing scheme; a second bus interface to transmit a set of compressed image data having a second addressing scheme; address translation circuitry to translate the first addressing scheme of the uncompressed image data into the second addressing scheme of the compressed image data; and encoding circuitry to encode the set of uncompressed image data received via the first bus interface to generate the set of compressed image data, wherein the apparatus is responsive to generation of the set of compressed image data to transmit the set of compressed image data via the second bus interface.

Accordingly, the present techniques also provide an interface apparatus which is based on the same principle as the above described interface apparatus which comprises decoding circuitry, but wherein the interface apparatus instead comprises encoding circuitry and the interface apparatus is therefore arranged to receive uncompressed image data at its first bus interface and to transmit a set of compressed image data via a second bus interface, wherein the uncompressed image data and the compressed image data use different (first and second) addressing schemes. The interface apparatus thus enables a device providing the set of uncompressed image data via the first bus interface to do so without knowledge of the second addressing scheme, the nature of the compression being applied to the image data, or the target of that compressed image data after the second bus interface and can simply interact with the interface apparatus in terms of uncompressed image data using the first addressing scheme.

In some embodiments an interface apparatus of this type (i.e. with encoding circuitry) comprises a header buffer, wherein the set of compressed image encoded by the encoding circuitry comprises a header portion and a payload portion, wherein header buffer is responsive to the header portion being less than a predetermined header size to store the header portion in the header buffer pending further encoding of a further set of uncompressed image data to provide a full header of the predetermined header size. The provision of such a header buffer thus enables the encoding circuitry to perform its encoding for sets of compressed image data which do not need to adhere to a particular size, in particular in terms of the defined header size for the encoding being performed. Accordingly, the encoding circuitry may more efficiently perform the encoding required, for example encoding only half a block at a time (also known as block split mode) but the header data can be accumulated until a full header size is ready to be written out, which is more efficient.

Some particular embodiments are now described with reference to the figures.

FIG. 1 schematically illustrates an image data processing system 10, comprising an interface apparatus 12 in one embodiment. The interface apparatus 12 is positioned between a display controller 14 and a memory 16, in which image data is stored in a compressed format. As shown in FIG. 1, the compressed format of the image data comprises a header part stored in a compressed header buffer 18 and a compressed body part stored in the compressed body buffer 20. The display controller 14 controls the display 22 and in order to provide pixel data for display by display 22, the display controller 14 interacts with the interface apparatus 12, in particular issuing read requests for uncompressed image data, and in response to this a decoder in the interface apparatus 12 reads compressed data from the external memory 16, decompresses it and returns the uncompressed data to the display controller 14. Also shown in FIG. 1 is a host CPU 24, which can configure the operation of the display control 14 and the interface apparatus 12.

Figure 2:
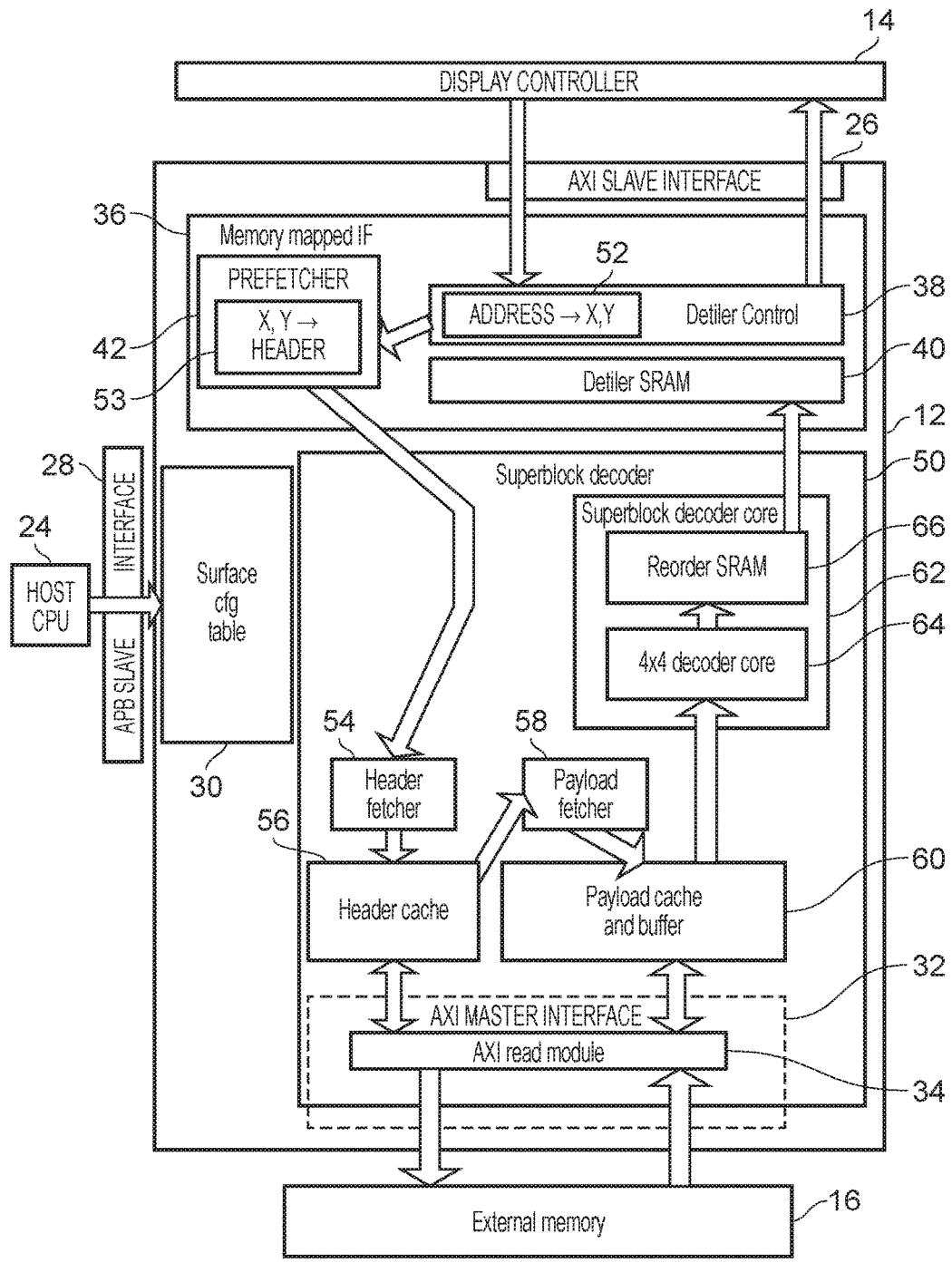
FIG. 2 schematically illustrates in more detail an interface apparatus such as that found in the system of FIG. 1.

FIG. 2 schematically illustrates in more detail the interface apparatus 12 shown in FIG. 1. The interface apparatus 12 comprises an AXI slave interface via which it communicates with the display controller 14. In particular, the interface apparatus 12 receives read requests for uncompressed image data from the display controller via the AXI slave interface 26. The interface apparatus 12 also comprises an APB slave interface 28 via which the host CPU 24 sets up a surface configuration in the surface configuration table 30 of the interface apparatus 12, defining various configurational parameters of the interface apparatus 12. Finally, the interface apparatus 12 also comprises an AXI master interface 32 via which it interacts with the external memory 16.

The AXI master interface is schematically illustrated in FIG. 2 as comprising the AXI read module 34.

The memory mapped interface (IF) 36 of the interface apparatus 12 comprises de-tiler control circuitry 38, a de-tiler SRAM buffer 40 and prefetching circuitry 42. Read requests for uncompressed image data received by the interface apparatus 12 from the display controller 14 are first handled by the de-tiler control circuitry 38 which communicates with the prefetching circuitry 42 in order to initiate the fetching of the requested image data and moreover the prefetching circuitry 42 seeks to ensure that the initiation of the retrieval of compressed image data from the external memory 16 happens before a read request for that image data is actually received by the interface apparatus 12. This helps to ensure that the memory latency associated with the retrieval of this compressed image data from the external memory 12 is hidden from the display controller 14. This is of particular use in this example, where the compressed image data is stored in a format comprising a header portion and a payload (body) portion in the memory, and a header portion must first be read in order to determine the corresponding payload portion. Thus for a given set of image data which is requested, first the corresponding header information must be retrieved from the external memory and thereafter the corresponding payload data must be retrieved from the memory, thus potentially increasing the memory latency.

Read requests are received from the display controller 14 using linear memory addresses (since the interface allows the display controller to act as though it is directly reading uncompressed images from memory). The de-tiler control 38 comprises address translation circuitry 52, which converts the linear memory addresses into spatial (x, y) coordinates (so that it can monitor which pixels are actually returning from the de-tiling memory 40). The prefetch circuitry 42 works on a block basis, keeping track of the (x, y) coordinate of the block to be fetched next. When the fetch is to be initiated, the prefetcher 42 uses its address conversion circuitry 53 to convert the (x, y) coordinate into a header address, and it issues a read request for that header, which is forwarded to the header fetcher 54, which issues a corresponding read request for the identified header block(s) from the external memory 16. This header read request is passed via the AXI master interface 32 to the external memory 16 and the retrieved header blocks are stored in the header cache 56. Thus retrieved, a header block is read in order to determine the corresponding payload data which must be retrieved with this information being passed to the payload fetcher circuitry 58, which itself causes a corresponding payload read request to be transmitted (via the AXI master interface 32) to the external memory 16 and the retrieved payload data is stored in the payload cache and buffer 60. More detail of the particular manner in which the payload data is retrieved and stored will be discussed below. The superblock decoder 50 comprises a superblock decoder core 62 which carries out the decoding of the compressed image data retrieved from the memory, with its 4×4 decoder core 64 accessing the payload data stored in the payload cache and buffer 60, and performing the decompression. A reorder SRAM 66 is used in order to allow the 4×4 decoder core 64 greater flexibility in the ordering in which it handles blocks for the decoding, and the decompressed blocks of image data are then, as the final stage of decoding, written into the de-tiler SRAM 40, from where the de-tiler control circuitry 38 reads lines of pixel data to be returned to the display controller 14 via the AXI slave interface 26.

Figure 3:
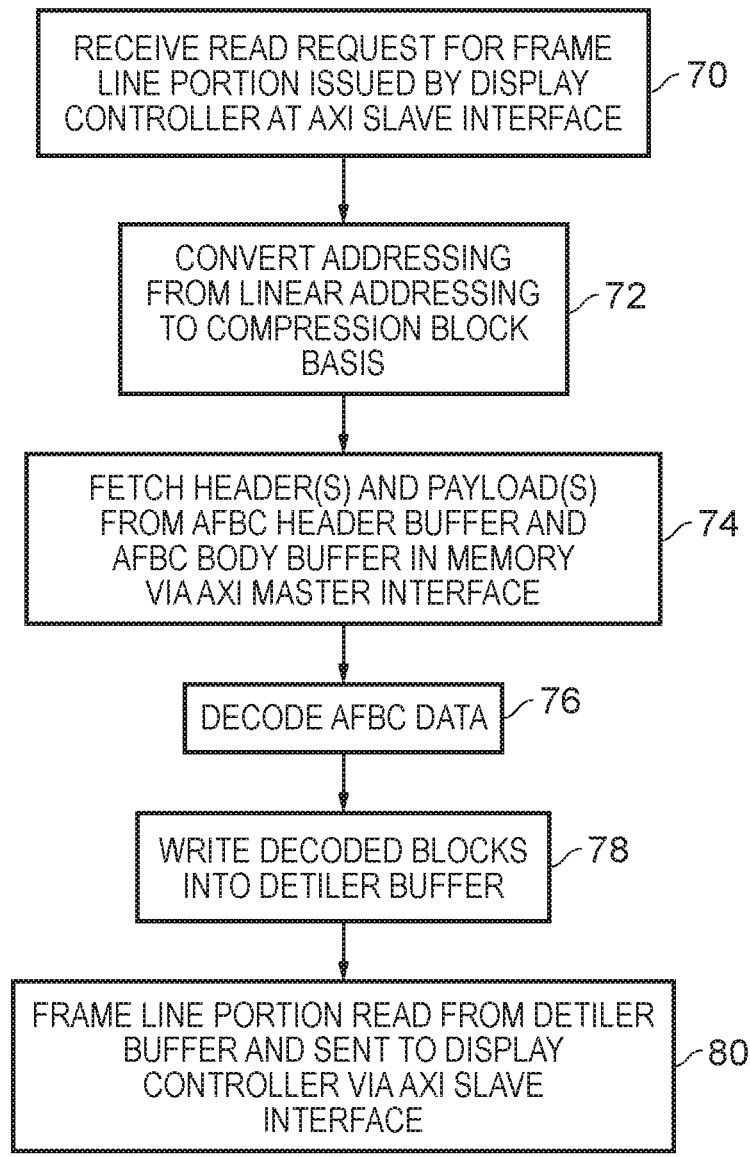
FIG. 3 shows a sequence of steps which are carried out in the method of operating an interface apparatus such as that shown in FIG. 1 in one embodiment.

FIG. 3 shows a sequence of steps which are carried out according to the method of one embodiment, when operating an interface apparatus such as interface apparatus 12 shown in FIGS. 1 and 2. At step 70 the interface apparatus receives a read request for a frame line portion issued by a display controller at its AXI slave interface. Then, at step 72, it converts the linear addressing used for this frame line portion into an addressing used for the corresponding compression blocks. With the compression blocks required to service the received read request thus identified, the corresponding header(s) and payload(s) are retrieved from the AFBC header buffer and AFBC body buffer in an external memory via the interface apparatus's AXI master interface. Note firstly that as mentioned above the process for retrieving header and payload data is typically a two stage read process, where first the header blocks are retrieved, and then the payload blocks identified within those header blocks are retrieved. Note also that in this example the compressed data stored in the external memory is compressed according to the AFBC protocol (ARM Frame Buffer Compression), although this is only one of many available compression formats which could be used. At step 76 the retrieved AFBC data is decoded and at step 78 decoded blocks of image data are written into the de-tiler buffer. Finally, at step 80, the originally requested frame line portion is read from the de-tiler buffer and sent to the display controller via the interface apparatus's AXI slave interface.

Further detail of the manner in which data is written to and read from the de-tiler buffer is now discussed with reference to FIGS. 4A-H and 5-9. As mentioned above, an issue relating to the efficient usage of a de-tiling SRAM is that it may be required for the content of the de-tiling SRAM to be written to on a block-by-block basis, but for the de-tiling SRAM to be read line-by-line. In order to operate efficiently in this context the de-tiling control circuitry and de-tiling buffer provided by the present techniques have a particular configuration and manner of addressing the buffer, the principle of which is illustrated by FIGS. 4A-H. Each of these figures shows a simple buffer of 8×2 pixels, wherein blocks of 2×2 pixels are used. It can be seen that the buffer in FIG. 4A has been filled with four blocks, wherein the number indicates which block the pixel belongs to and T/B indicates whether the pixel belongs to the top or bottom row. Moving on to FIG. 4B, this figure shows the content of the buffer after the first four pixels of the top row have been read out. Now, rather than waiting for all of one of the blocks that were written into the buffer in order to generate the contents shown in FIG. 4A to be read out, the present techniques recognise that the four spaces shown in FIG. 4B are sufficient for the storage of a new 2×2 block, if it is written in a different order. This is illustrated by FIG. 4C, in which the next 2×2 pixel block (number 4) has been written into the buffer. Further, after reading out the rest of the pixels of the first four blocks (numbers 0-3) and replacing them with new image data blocks, the content of the buffer is as shown in FIG. 4D.

Now, in order to read out the top line row of pixels, it is necessary to "jump" in the buffer (i.e. to introduce skip steps in the sequence of buffer addresses to be read from) in order to read the sequence of pixels from a given pixel row (line). These jumps are illustrated by the arrows in FIG. 4D, i.e. from 4T to 5T, from 5T to 6T and from 6T to 7T. This pattern continues and FIG. 4E shows that new blocks 8 and 9 have been written into the space in the buffer created by the reading out of the top row 4T-7T. FIG. 4F then shows the farther step where the bottom row 4B-7B has been read out and the available buffer space then filled by new blocks 10 and 11. Thus populated, the pixel data is then available in the buffer to be read out for the next pixel row (8T-11T) and the arrows in FIG. 4F show the skips steps necessary for this row to be read out. The reading out of pixel row 8T-11T allows new blocks 12 and 13 to be written into the buffer and it can be seen that these already repeat the storage pattern of blocks 0 and 1 in FIG. 4A. Finally, the reading out of the bottom row 8B-11B allows new blocks 14 and 15 to be written into the buffer as shown by FIG. 4H and it can be seen from FIG. 4H that the same pattern of FIG. 4A has once again been reached, i.e. the skip step pattern has "wrapped around", and to read out the next two pixel lines (12T-15T and 12B-15B) sequential buffer addresses can again be read. FIG. 5 schematically illustrates the use of a write pointer and a read pointer maintained by the de-tiling buffer control circuitry to indicate valid buffer addresses and invalid (available) buffer addresses wherein each is constrained only to be able to increase (to the left in FIG. 5) and the read pointer is constrained not be able to overtake the write pointer.

FIG. 6 presents another example of the use of the de-tiling buffer to store image data words of uncompressed image data. Note that, in contrast to FIGS. 4A-H, the illustration of FIG. 6 corresponds to three block rows of pixel data across a frame width and the numbers shown correspond to buffer addresses, whilst the illustration of FIGS. 4A-H shows buffer address locations and the numbering and lettering correspond to pixel locations. FIG. 6 shows how for a first row of blocks of pixel data, eight buffer addresses (0-7) are used to store the image data for a first block, the next sequential eight sequential buffer addresses (8-15) are used to store the image data for a second block in this block row, and so on. From the numbering of the buffer addresses it can then be seen that when a first pixel row of the image frame is to be read out, this must be read from buffer addresses 0, 8, 16, 24 and so on. The next pixel row is read out from buffer addresses 1, 9, etc., and so on, with the final pixel row of the first block row being read out from buffer addresses 7, 15, 23, 31, and so on.

Referring now to block row two in FIG. 6, it can be seen that the first block of block row two has been stored in the first eight buffer addresses which were freed up by the reading of (part of) the first pixel row of the first block row, i.e. buffer addresses 0, 8, 16, . . . , 48, 56 i.e. the skip step is 8. This pattern continues, wherein the second block of the second block row is written into buffer addresses 64, 72, . . . , 112, 120. This continues but for the further blocks of this row note that the buffer addresses used will wrap around when the buffer address exceeds 239, since as shown in the first block row in FIG. 6 the number of image data words in each frame width block row is 240. Looking at the first pixel row of the second block row shown in FIG. 6, it can be seen that to read out the pixel data corresponding to this first pixel row, the buffer addresses 0, 64, 128 etc. must be read, i.e. the skip step is now 64. For the next pixel row, the buffer addresses 8, 72 etc. must be read. Going one block row iteration further, and comparing the buffer address numbering shown for block row two and block row three in FIG. 6, it can be seen that the reading out of the first pixel row of block two frees up a sequence of buffer addresses into which the first block of the third block row can be written, namely at addresses 0, 64, 128, 192, 17, 81, 145 and 209. Note that the wrapping round here has caused the fifth data word of this sequence to be written to buffer address 17, and not to buffer address 256 (192+64), i.e. that the buffer address has been calculated as 256−240+1, where the addition of 1 accounts for starting a new row and 240 is the number of image words which are used to represent a full frame width block row (as can be seen in the first block row of FIG. 6). Note further from the third block row shown in FIG. 6 that the pattern continues and indeed the second block of the third block row shown in FIG. 6 begins at buffer address 33, this being 209+64−240.

Figure 7:
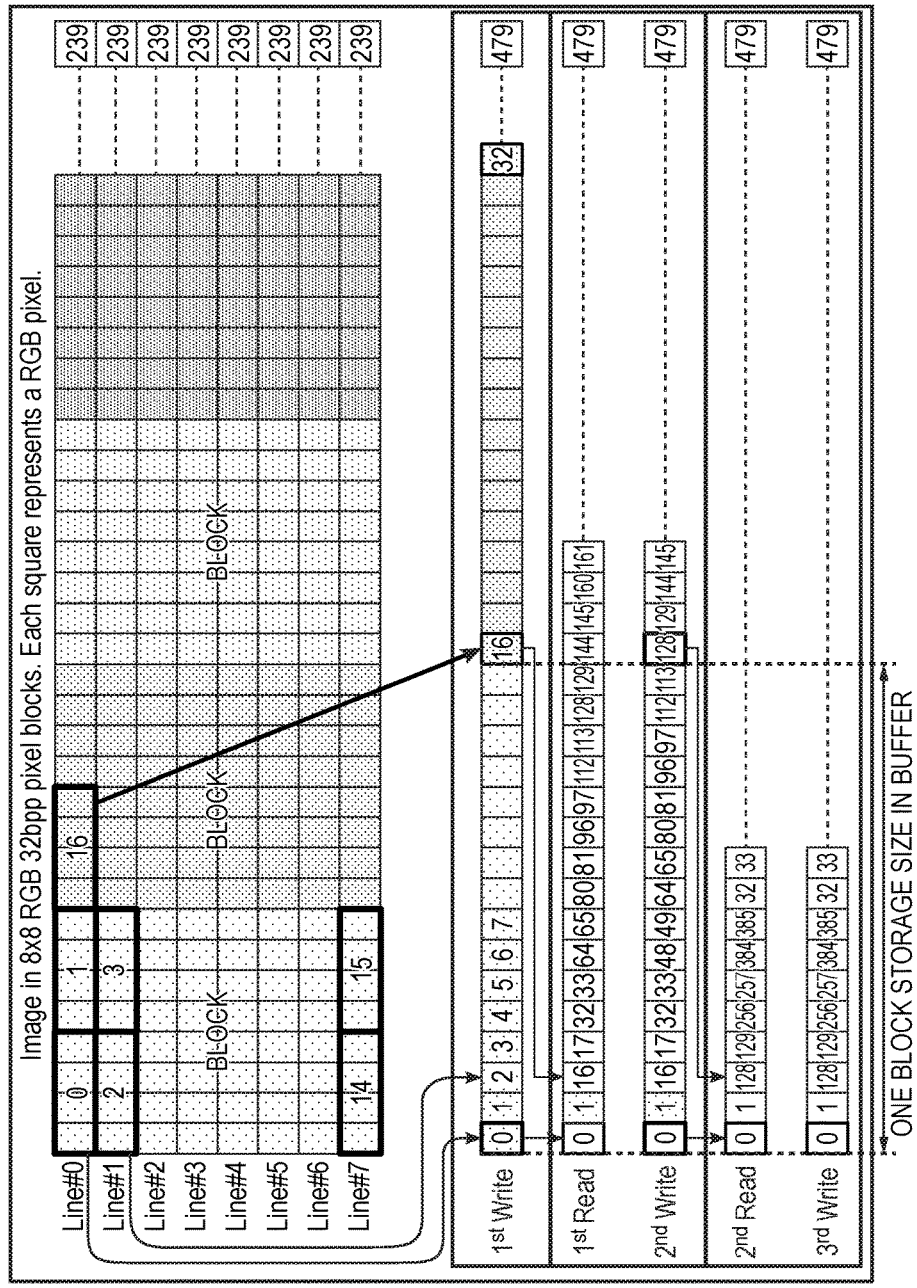
FIG. 7 illustrates another example of a block row and the corresponding reads from and writes into the de-tiling buffer in one embodiment.

FIG. 7 shows another illustration of the usage of a de-tiling buffer in one embodiment, wherein the upper part of FIG. 7 is a pixel representation showing a first row of blocks of pixels, wherein each 8×8 pixel block is represented by sixteen data words. Moreover, note that in this example two image words are used to represent each pixel row of each block. This in particular has the consequence that the sequence of buffer addresses shown in the line "first read" in the lower part of FIG. 7 (which shows buffer addresses) is 0, 1, 16, 17, 32 etc. The number 239 in each box at the far right of the block row in the upper part of FIG. 7 indicates that there are 240 pixels in each pixel row illustrated. Note that there are the same number (480) of image data words used for each block row as there are buffer addresses in the de-tiling buffer. It is also important to note that it is the number of image data words used for a block row which provides the wrap around point for the addressing, and not the number of buffer addresses which are (at maximum) available in the de-tiling buffer. Whilst the de-tiling buffer must comprise at least the same number of buffer addresses as image data words required to store one block row, the size of the buffer could exceed this, but does not need to. The additional storage capacity would not be used.

Overall it can be seen that after a first block row has been written to sequential buffer addresses, the skip steps required to read out the lines of pixel data (and indeed to then write further block data into the buffer addresses freed up by that read) is represented by $B \cdot (N/B)^R - (B-1)$, where R is the block row number, B is the number of image data words in each pixel line of a block, and N is the number of image data words used for each block. Hence for example with reference to FIG. 7, where N=16 and B=2, the skip steps are given by $2 \times (16/2)^R - (2-1)$, i.e. $2 \cdot (8)^R - 1$, being 15 for the first read/second write and 127 for the second read/third write.

Figure 8:
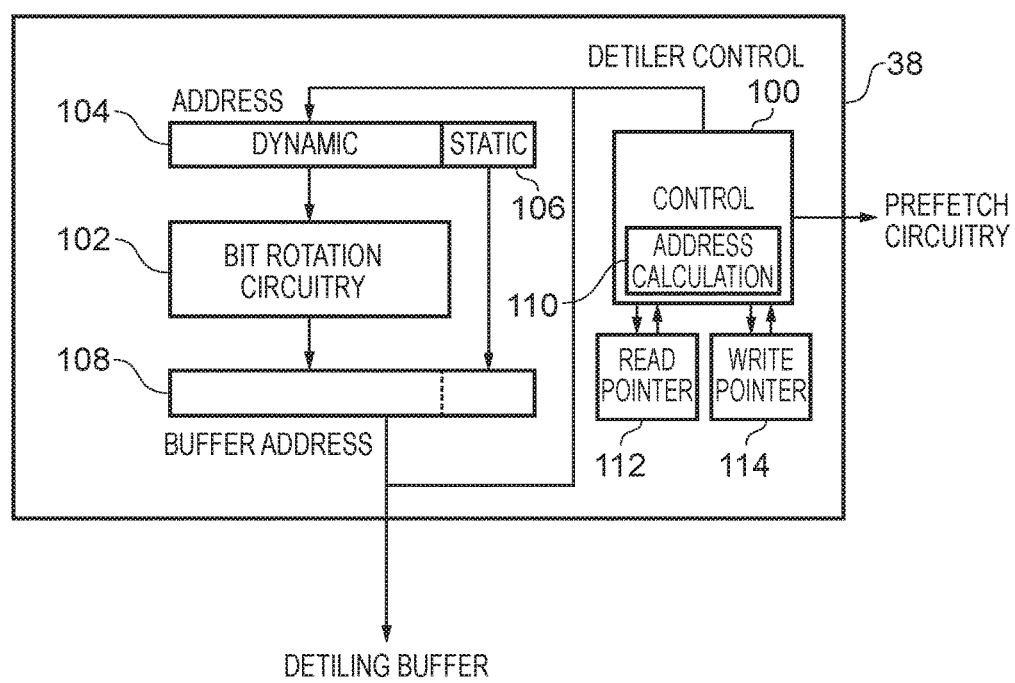
FIG. 8 schematically illustrates the de-tiling control circuitry in one embodiment.

FIG. 8 schematically illustrates the configuration of the de-tiler control circuitry 38 in one embodiment. Overall control of the de-tiler control circuitry is maintained by the control circuitry 100, which in particular determines the buffer addresses to which in each data word is written to and read from in the de-tiling buffer. The de-tiler control circuitry 38 shown in FIG. 8 has two mechanisms by which it can do this, the first being illustrated by the bit rotation circuitry 102 which receives an address from the control circuitry 100, which is shown as having a dynamic portion 104 and a static portion 106. The bit rotation circuitry is configured to apply a bit rotation to the dynamic portion 104 of the address to "swizzle" this portion and generate a new address 108 which is then used for the access (whether read or write) in the de-tiling buffer. The static portion 106 of the received address is not changed, but the bits of the dynamic portion 104 are rotated in the generated buffer address 108. Hence, for example where a sequence of addresses, 0, 1, 2, 3 etc. is received by the bit rotation circuitry 102, the swizzling operation it applies can then generate a resulting sequence of addresses such as 0, 8, 16, 24 (such as is used in the example of FIG. 6) by rotating the bits of the addresses such that the zero bit moves to the second bit and hence "1" is translated to 8, and "2" is translated to 16 etc. The static portion 106 may be used in order to provide a sequence of buffer addresses such as that discussed with reference to FIG. 7, in which example the zero bit (LSB) is then the static portion such that from a sequential sequence of input addresses (0, 1, 2, 3 etc.) a resulting set of buffer addresses 0, 1, 16, 17, 32, 33 results by moving the first bit to the fourth bit position.

The control unit 100 may also generate buffer addresses by a different mechanism, which is represented by the address calculation unit 110 in FIG. 8, where this address calculation circuitry is arranged to perform the address generation for buffer addressed to be used according to the functions set out in FIG. 9. Note also that the address calculation of FIG. 9 can be universally used, whilst the bit swizzling of FIG. 8 requires an address space which is a power-of-two. However, if the address space is not a power-of-two, the address space can be subdivided into regions and the bit-swizzling technique is then applied in dependence on which region an address is in.

FIG. 8 also shows that the control unit 100 of the de-tiler control circuitry 38 maintains a read pointer 112 and a write pointer 114 (see also FIG. 5) in order to keep track of valid and available buffer addresses within the de-tiling buffer. Note that the control circuitry 100 can maintain the read and write pointers in a simple linear fashion with respect to the sequential buffer addresses which it generates and not in terms of the modified buffer addresses which are generated by the bit rotation circuitry 102 or address calculation circuitry 110, thus simplifying the mechanism for keeping track of the validity of buffer addresses.

Figures 10A, 10B:
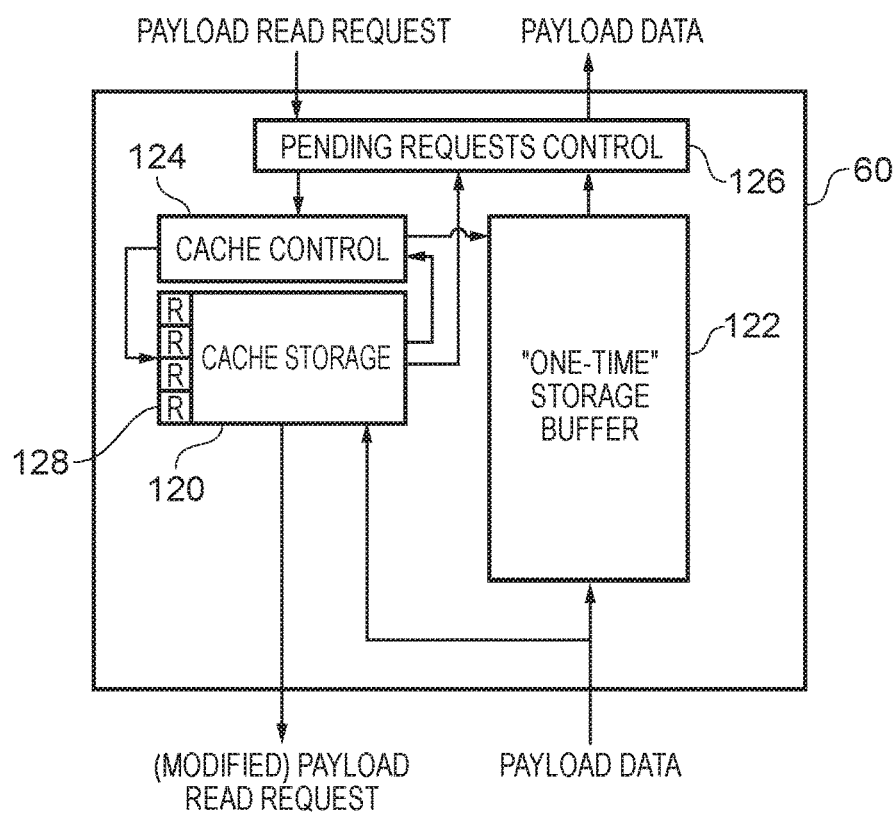
FIG. 10A illustrates the correspondence between payload superblock size and cache line size in one embodiment.
FIG. 10B schematically illustrates payload cache and buffer control circuitry in one embodiment.

FIG. 10A illustrates the size of payload superblocks that are used in one embodiment for the storage of compressed image data in the external memory. In this example, the compression format is the above mentioned AFBC protocol where the buffers in memory are typically split into two buffers, a header buffer and a body (payload) buffer. The decoder of the interface apparatus issues read requests for whole or half superblocks at a time (which in this example can therefore be 16×16 or 16×8 pixels or alternatively 16×16 or 32×8 pixels). The storage of the superblocks in memory is tightly packed and furthermore as the size of each packed superblock is on byte granularity, it is likely that the end of one superblock and the start of the next superblock are on the same cache line. FIG. 10A shows the example of 64 byte cache lines and it can be seen that this sharing of a cache line between superblocks occurs in the cache lines beginning at bytes 192, 512 and 704. FIG. 10A shows that a typical size for a payload superblock is a few hundred bytes. Hence, with reference to the illustration of FIG. 10A, it can be seen that there are two kinds of 64 byte words, those that will be used only once and those that will be used multiple times. Note that the example of FIG. 10A only shows 64 byte words that will be used twice, i.e. they are shared between two superblocks, but in principle a given cache line can be shared between more than two superblocks.

FIG. 10B schematically illustrates the payload cache and buffer 60 (see FIG. 2) in one embodiment. In particular, it is to be noted that, in order to avoid reading the shared words twice, the storage capacity is split into two parts: a 64 byte oriented cache 120 and a "one-time" storage buffer 122. The payload cache and buffer 60 further comprises cache control circuitry 124 and pending requests control circuitry 126 in the schematic illustration of FIG. 10B. When a payload request is received by the payload cache and buffer 60, firstly the request is noted as pending within the pending control request circuitry 126 and it is then passed further to the cache control circuitry 124 which looks up in the cache 120 to see if either of the first and last words of payload data are already stored in the cache. Further, the relevant cache storage lines in the cache 120 are each provided with a reference counter (R) 128 which is incremented when a pending request which uses that cache line is received. If either of the first or last words of the payload read request hit in the cache then the cache control circuitry 124 modifies the read request to remove these and the remainder of the payload read request is then forwarded for retrieval from the payload buffer in the external memory. For the "middle" section of the payload data requested (i.e. that portion apart from the first and last word), a continuous memory area in the "one-time" storage buffer 122 is also allocated by the cache control circuitry 124.

When the requested payload data then returns from external memory, the "middle" portion is stored in the allocated area of the "one-time" storage buffer 122 and if necessary either or both of the first and last words of the original payload request are stored in the cache storage 120. The payload read request is considered serviced when the first and last words hit in the cache and the middle portion has been fully read from the one-time storage buffer. Then the reference counters 128 are decremented and the allocated memory area in the one-time storage buffer is released. The pending request control circuitry 126 administers this. For example, using the 64 byte cache line example of FIG. 10A, in order to be able to hold the payload data for four superblocks, the cache storage 120 is configured to be able to store eight 64 byte lines, whilst the one-time storage buffer 122 is configured to be able to store sixty four 64 byte words. Advantageously though the circuitry which must be provided in association with the cache storage 120 which make it a "cache", rather than merely a buffer (i.e. that enable cache look-ups to be performed and so on) need only be provided in association with the smaller cache storage 120 and not with the larger one-time storage buffer 122. Overall, the circuitry required to provide the storage capacity of the payload cache and buffer 60 is smaller than it would be if all 72 lines were cache lines.

Figure 11A:
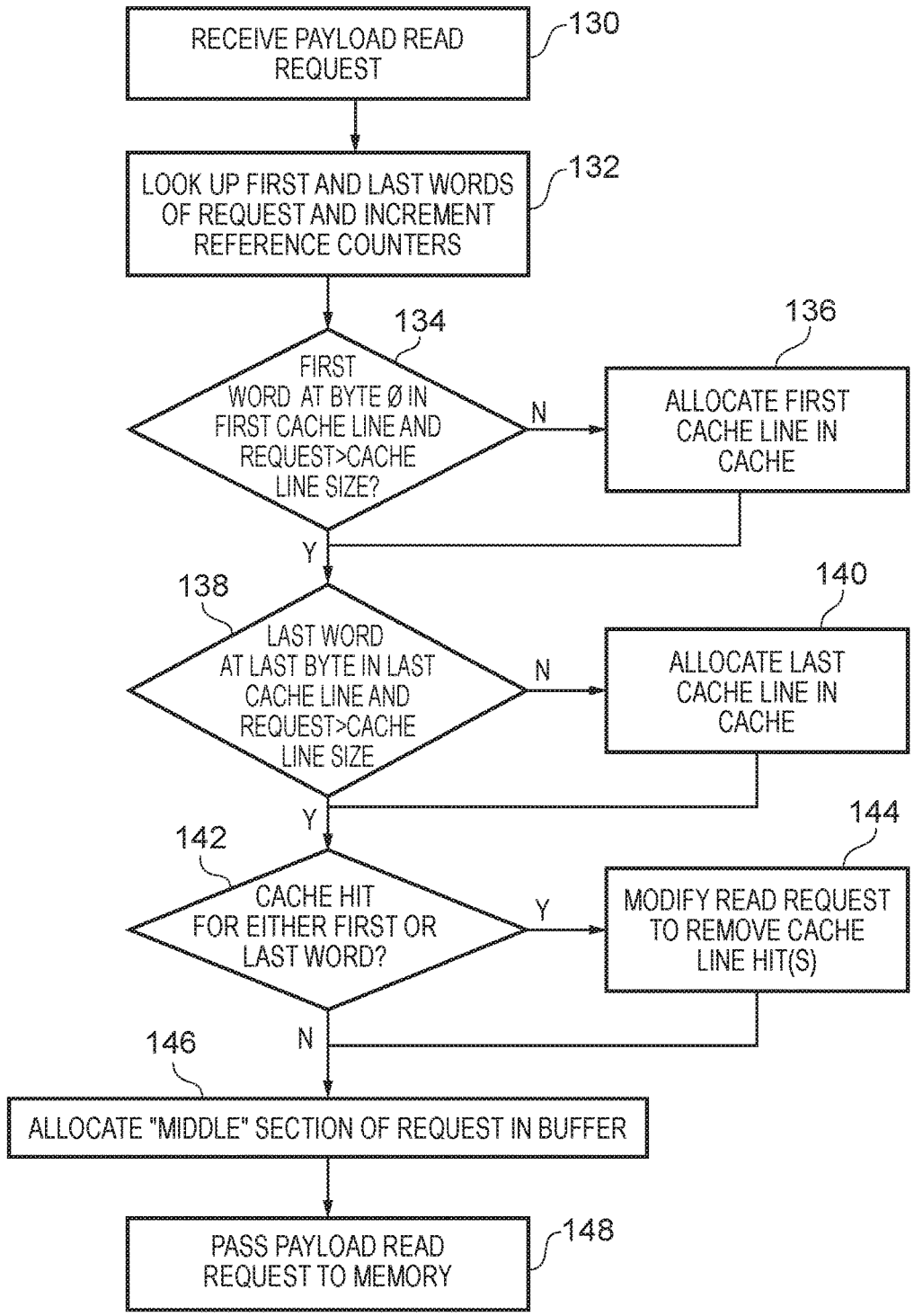
FIGS. 11A and 11B show a sequence of steps which are carried out in servicing a payload read request in one embodiment.

FIG. 11A shows a sequence of steps which are taken in the method of one embodiment when operating a payload cache and buffer such as that described above with reference to FIG. 10B. The flow begins at step 130 where a payload read request is received. Then at stage 132 a lookup procedure in the cache storage is performed for the first and last words of the payload read request and the reference counters for the corresponding cache lines are incremented. Then at step 134 it is determined if the first word is at byte zero in the first cache line and if the size of the entire payload read request is greater than the cache line size. If this is not the case then the flow proceeds via step 136 where the first cache line corresponding to the payload read request is allocated in the cache, since this indicates that the start of the payload superblock is in a shared cache line. Similarly at step 138, it is determined if the last word in the payload read request is at the last byte of the corresponding cache line and if the whole read request is greater than a cache line size. If this is not the case then the flow proceeds via step 140 where the last cache line is allocated in a cache, since this indicates that the end of this payload superblock is in a cache line that is shared with another payload superblock. Then at step 142 it is determined if a cache hit has been found for either the first or the last word. If it has the flow proceeds via step 144 where the read request is modified to remove that cache line hit or those cache line hits. At step 146 the "middle" section of the request (i.e. removing the first and last word) is allocated into the one-time storage buffer. Then at step 148 the payload read request (possibly modified) is passed to the external memory.

Figure 11B:
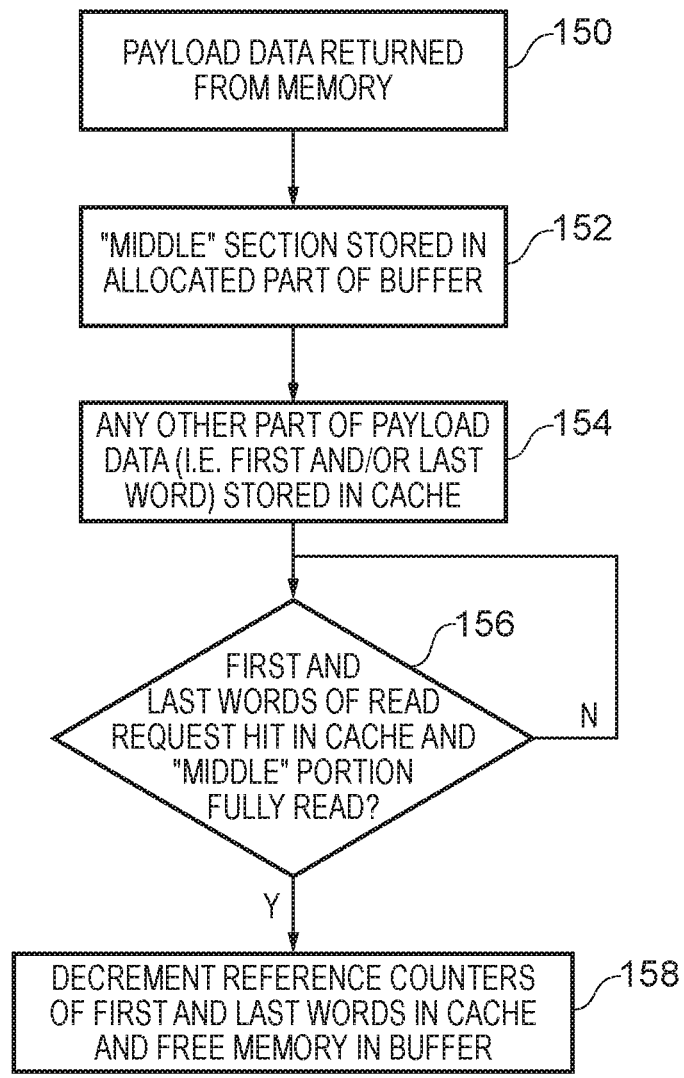

FIG. 11B now shows the sequence of steps which are carried out in one embodiment following those of FIG. 11A when the payload data is returned from memory. When this happens (step 150) then the "middle" section of the payload data is stored in the allocated part of the buffer at step 152. At step 154 any other part of the payload data i.e. for which memory was not allocated in the buffer, is then stored in the cache. In other words, a first or last word that is found to be part of a shared cache line will then be stored in cache, but a first or last word which was determined not to be part of shared cache line will have been allocated into the storage buffer and will have been stored there in step 152. In that sense it should be appreciated that the "middle" section referred to in step 152 might in fact include all of the payload data, either because the entire payload read request only comprises cache lines which are not shared, or because both the first and the last word have already hit in the cache and therefore only the portion of the payload read request which only applies to one payload superblock has been returned at step 150. With the cache storage and one-time buffer thus populated, at step 156 it is determined if the first and last words of the read request have hit in the cache and the "middle" portion has been fully read. Whilst this is not true the flow waits at this step, but once it is true the read request is considered serviced and at step 158 the reference counters of the first and last words in the cache are decremented and the memory allocated in the buffer is freed.

Figure 12:
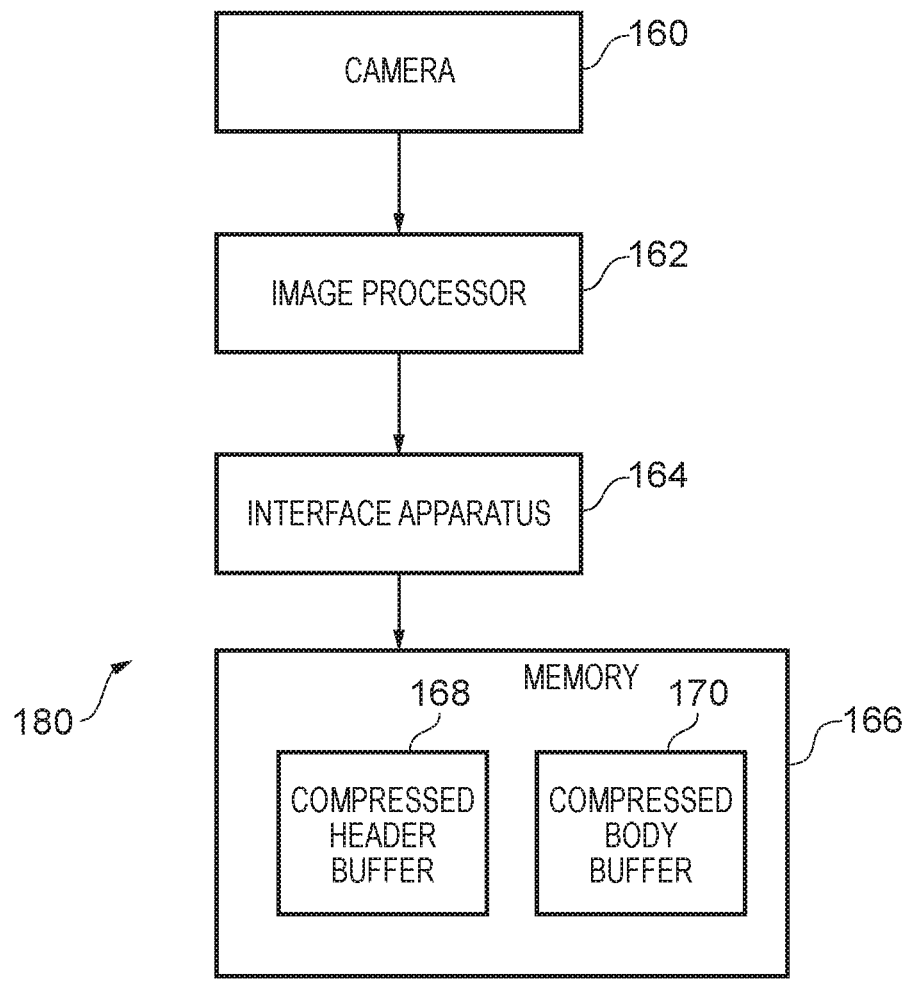
FIG. 12 schematically illustrates an image processing system comprising an interface apparatus in one embodiment.

FIG. 12 schematically illustrates a different interface apparatus 164, forming part of an image data processing system 180. In this example embodiment, a camera 160 passes raw image data to an image processor 162, which performs various image processing operations to produce a set of (uncompressed) image data which is to be stored in memory. This set of uncompressed image data is passed to the interface apparatus 164, which in turn compresses the image data into a set of compressed image data and stores this in the external memory 166, and in the particular example shown in FIG. 12 it does this by storing a compressed header in the compressed header buffer 168 and a compressed body (payload) in the compressed body buffer 170. The image processor 162 references the image in terms of a linear addressing scheme, whilst the compressed data stored in the memory 166 is stored there in a block-based format. The interface apparatus 164 enables the image processor to transmit its uncompressed image data using the linear addressing scheme and for the memory 166 to handle the compressed image data in terms of the block-based addressing scheme.

Figure 13:
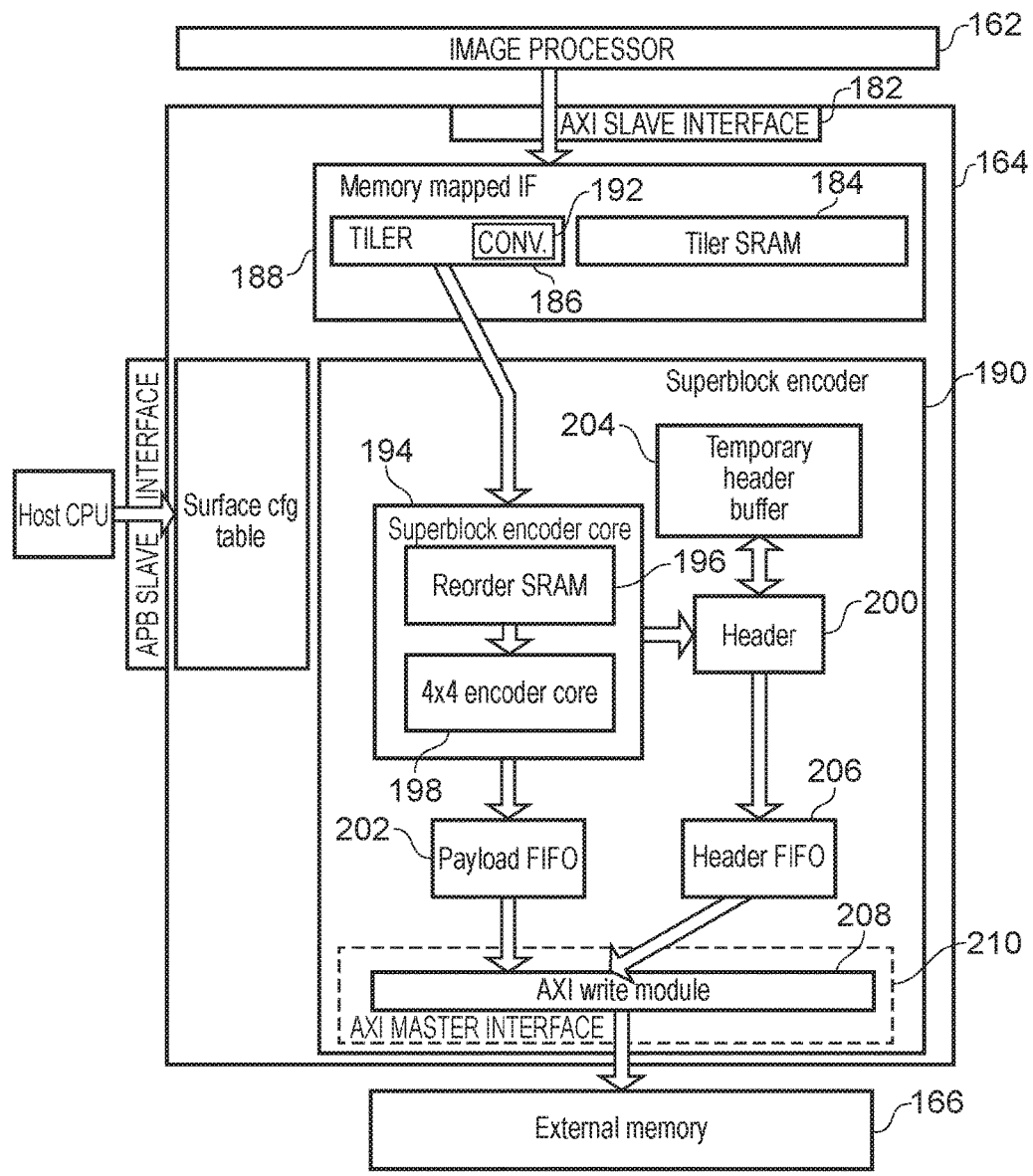
FIG. 13 schematically illustrates more detail of the interface apparatus of FIG. 12 in one embodiment.

Further detail of the interface apparatus 164 is shown in FIG. 13. The uncompressed image data received from the image processor 162 is received via AXI slave interface 182 and is temporarily stored in the tiler SRAM 184 under the control of the tiler 186 (which also comprises the address conversion circuitry 192 to map between the linear addressing scheme and the block-based addressing), these components forming part of the memory mapped interface 188. The tiler then passes data to the superblock encoder 190, which comprises the superblock encoder core 194. The superblock encoder core 194 performs the compression (encoding) of the image data using its reorder SRAM 196 and the 4×4 encoder core 198. The encoded headers (or portions thereof) which are generated by this process are handled by the header circuitry 200, whilst the compressed payload data generated is passed to the payload FIFO 202. The header circuitry 200 has further access to a temporary header buffer 204 which is provided so that the encoding can happen in "block split mode" where only half a superblock is provided and encoded at a time. This encoding of only half a block at a time means that initially half the superblock payload is generated and half of the corresponding header. However, whilst the payload data can be written out directly via the payload FIFO 202, headers must be generated in full header units (in the example of the AFBC encoder shown in FIG. 13 this being header blocks of size 16 bytes. Using the temporary header buffer 204 enables a full header unit to be accumulated before the header circuitry 200 passed this to the header FIFO 206 in order to be written out to the external memory 166. Writing out of the data in the payload FIFO 202 and header FIFO 206 to the external memory 166 happens via the AXI write module 208 of the AXI master interface 210. This arrangement means that the data streams for the payload and header data can be written out to external memory 166 in longer bursts, which is more efficient, rather than for example making use of write strobes in order to write out partial headers as soon as they are generated.

By way of overall summary of some embodiments, an interface apparatus and method of operating the same are provided. The interface apparatus receives an uncompressed image data read request using a first addressing scheme at a first bus interface and transmits a compressed image data read request using a second addressing scheme from a second bus interface. Address translation circuitry translates between the first addressing scheme and the second addressing scheme. Decoding circuitry decodes a set of compressed image data received via the second bus interface to generate the set of uncompressed image data which is then transmitted via the first bus interface. The use of a second addressing scheme and image data compression is thus transparent to the source of the uncompressed image data read request, and the interface apparatus can therefore be used to connect devices which use different addressing schemes and image data formats, without either needing to be modified.

In the present application, the words "configured to . . . " or "arranged to" are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" or "arranged to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. An interface apparatus comprising:
a first bus interface to receive an image data read request, wherein the image data read request specifies a set of uncompressed image data using a first addressing scheme;
a second bus interface to transmit a compressed image data read request using a second addressing scheme;
address translation circuitry to translate the first addressing scheme of the image data read request into the second addressing scheme of the compressed image data read request, wherein the compressed image data read request specifies a set of compressed image data corresponding to the set of uncompressed image data;
decoding circuitry to decode the set of compressed image data received via the second bus interface to generate the set of uncompressed image data,
wherein the apparatus is responsive to generation of the set of uncompressed image data to transmit the set of uncompressed image data via the first bus interface;
a compressed image data cache storage and a compressed image data buffer to store the set of compressed image data received via the second bus interface for access by the decoding circuitry; and
control circuitry responsive to the compressed image data read request to perform a lookup in the compressed image data cache storage for a first word and a last word specified in the compressed image data read request,
wherein the control circuitry is responsive to at least one of the first word and the last word hitting in the compressed image data cache storage to modify the compressed image data read request to omit at least one cache line request corresponding to the at least one of the first word and the last word which hit.

2. The interface apparatus as claimed in claim 1, comprising a third bus interface to receive configuration data to configure operation of at least one of the address translation circuitry and the decoding circuitry.

3. The interface apparatus as claimed in claim 1, wherein the first addressing scheme is a spatial coordinate-based addressing scheme and the second addressing scheme is a compression block-based addressing scheme.

4. The interface apparatus as claimed in claim 3, comprising:
a de-tiling buffer to store the set of uncompressed image data decoded by the decoding circuitry before transmission via the first bus interface; and
de-tiling control circuitry to control access to the de-tiling buffer such that the set of uncompressed image data is written to the de-tiling buffer in compression block units and is read from the de-tiling buffer in pixel row units.

5. The interface apparatus as claimed in claim 4, wherein the de-tiling control circuitry is arranged to administer an access procedure with respect to the de-tiling buffer, the access procedure comprising:
a) writing image data words for a first row of blocks of uncompressed image data to the de-tiling buffer at sequential buffer addresses, wherein each block is represented by N image data words;
b) reading image data words for a pixel row from the de-tiling buffer from a read sequence of buffer addresses which comprises skip steps of $B \cdot (N/B)^R - (B-1)$ buffer addresses, where R is a block row number and B is the number of image data words in each pixel line of a block, and the buffer addresses are subject to modulo M, where M is the number of image data words in each frame-width block row;
c) when N image data words have been read from the de-tiling buffer, writing image data words to the de-tiling buffer at the read sequence of buffer addresses;
iteratively repeating steps b) and c).

6. The interface apparatus as claimed in claim 5, wherein B is at least two.

7. The interface apparatus as claimed in claim 5, comprising address manipulation circuitry to generate the read sequence of buffer addresses from a sequential set of buffer addresses by applying a bit rotation operation to the sequential set of buffer addresses.

8. The interface apparatus as claimed in claim 7, wherein the sequential set of buffer addresses comprise a static portion which is not subject to the bit rotation operation.

9. The interface apparatus as claimed in claim 4, comprising image data validity circuitry to maintain a read pointer and a write pointer with respect to buffer addresses in the de-tiling buffer, wherein buffer addresses between the read pointer and the write pointer hold valid image data.

10. The interface apparatus as claimed in claim 4, comprising prefetching circuitry to monitor occupancy of the de-tiling buffer and, when the de-tiling buffer has capacity to store a block of image data, to instruct the decoding circuitry to decode compressed image data corresponding to a next block of image data for which a subsequent image data read request is expected.

11. The interface apparatus as claimed in claim 1, wherein the control circuitry comprises a reference counter for each cache line in the compressed image data cache storage,
   the control circuitry is responsive to reception of the compressed image data read request to increment reference counters of cache lines corresponding to the compressed image data read request,
   the control circuitry is responsive to both the first word and the last word hitting in the compressed image data cache storage and content of the compressed image data buffer for the compressed image data read request having been read to decrement the reference counters of the cache lines corresponding to the compressed image data read request, and
   the control circuitry is responsive to a reference counter of a cache line being decremented to a predetermined value to mark the cache line as unused.

12. A method of operating an interface apparatus comprising:
   receiving an image data read request at a first bus interface, wherein the image data read request specifies a set of uncompressed image data using a first addressing scheme;
   translating the first addressing scheme of the image data read request into a second addressing scheme of a compressed image data read request, wherein the compressed image data read request specifies a set of compressed image data corresponding to the set of uncompressed image data;
   transmitting a compressed image data read request using a second addressing scheme from a second bus interface;
   decoding the set of compressed image data received via the second bus interface to generate the set of uncompressed image data;
   storing the set of compressed image data received via the second bus interface in a compressed image data cache storage and a compressed image data buffer for access in the decoding;
   in response to the compressed image data read request, performing a lookup in the compressed image data cache storage for a first word and a last word specified in the compressed image data read request;
   in response to at least one of the first word and the last word hitting in the compressed image data cache storage, modifying the compressed image data read request to omit at least one cache line request corresponding to the at least one of the first word and the last word which hit; and
   in response to generation of the set of uncompressed image data, transmitting the set of uncompressed image data via the first bus interface.

13. An interface apparatus comprising:
   means for receiving an image data read request at a first bus interface, wherein the image data read request specifies a set of uncompressed image data using a first addressing scheme;
   means for translating the first addressing scheme of the image data read request into a second addressing scheme of a compressed image data read request, wherein the compressed image data read request specifies a set of compressed image data corresponding to the set of uncompressed image data;
   means for transmitting a compressed image data read request using a second addressing scheme from a second bus interface;
   means for decoding the set of compressed image data received via the second bus interface to generate the set of uncompressed image data;
   means for storing the set of compressed image data received via the second bus interface in a compressed image data cache storage and a compressed image data buffer for access by the means for decoding;
   means for performing a lookup in the compressed image data cache storage, in response to the compressed image data read request, for a first word and a last word specified in the compressed image data read request;
   means for modifying the compressed image data read request, in response to at least one of the first word and the last word hitting in the compressed image data cache storage, to omit at least one cache line request corresponding to the at least one of the first word and the last word which hit; and
   means for transmitting the set of uncompressed image data via the first bus interface in response to generation of the set of uncompressed image data.

14. An interface apparatus comprising:
   a first bus interface to receive a set of uncompressed image data having a first addressing scheme;
   a second bus interface to transmit a set of compressed image data having a second addressing scheme;
   address translation circuitry to translate the first addressing scheme of the uncompressed image data into the second addressing scheme of the compressed image data; and
   encoding circuitry to encode the set of uncompressed image data received via the first bus interface to generate the set of compressed image data,
   wherein the encoding circuitry comprises a header buffer,
   wherein the set of compressed image data encoded by the encoding circuitry comprises a header portion and a payload portion,
   wherein header buffer is responsive to the header portion being less than a predetermined header size to store the header portion in the header buffer pending further encoding of a further set of uncompressed image data to provide a full header of the predetermined header size,
   wherein the apparatus is responsive to generation of the set of compressed image data to transmit the set of compressed image data via the second bus interface.

15. A method of operating an interface apparatus comprising:
   receiving a set of uncompressed image data at a first bus interface, the set of uncompressed image data having a first addressing scheme;

translating the first addressing scheme of the uncompressed image data into a second addressing scheme of a set of compressed image data;

encoding the set of uncompressed image data received via the first bus interface to generate the set of compressed image data, wherein the encoding has access to a header buffer, and wherein the set of compressed image data comprises a header portion and a payload portion;

in response to the header portion being less than a predetermined header size, storing the header portion in the header buffer pending further encoding of a further set of uncompressed image data to provide a full header of the predetermined header size; and in response to generation of the set of compressed image data, transmitting the set of compressed image data via the second bus interface.

16. An interface apparatus comprising:

means for receiving a set of uncompressed image data at a first bus interface, the set of uncompressed image data having a first addressing scheme;

means for translating the first addressing scheme of the uncompressed image data into a second addressing scheme of a set of compressed image data;

means for encoding the set of uncompressed image data received via the first bus interface to generate the set of compressed image data, wherein the means for encoding has access to a header buffer, and wherein the set of compressed image data comprises a header portion and a payload portion means for storing the header portion in the header buffer, in response to the header portion being less than a predetermined header size, pending further encoding of a further set of uncompressed image data to provide a full header of the predetermined header size; and means for transmitting the set of compressed image data via the second bus interface in response to generation of the set of compressed image data.

* * * * *